United States Patent
Pearce (10) Patent No.: US 9,168,460 B2
(45) Date of Patent: Oct. 27, 2015

(54) SYSTEM AND METHOD OF AUTOMATIC ENTRY CREATION FOR BLOGS, WEB PAGES OR FILE-SHARING SITES BASED ON GAME EVENTS

(71) Applicant: Sony Computer Entertainment America LLC, San Mateo, CA (US)

(72) Inventor: Nathan Pearce, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

(21) Appl. No.: 14/637,196

(22) Filed: Mar. 3, 2015

(65) Prior Publication Data

US 2015/0174492 A1   Jun. 25, 2015

Related U.S. Application Data

(63) Continuation of application No. 14/447,271, filed on Jul. 30, 2014, now Pat. No. 8,972,503, which is a continuation of application No. 12/305,623, filed as application No. PCT/US2008/052362 on Jan. 29, 2008, now Pat. No. 8,856,225.

(60) Provisional application No. 61/062,309, filed on Jan. 25, 2008, provisional application No. 60/898,359, filed on Jan. 29, 2007.

(51) Int. Cl.
*G06F 15/16* (2006.01)
*A63F 13/60* (2014.01)
*G06Q 10/10* (2012.01)
*A63F 13/30* (2014.01)
(Continued)

(52) U.S. Cl.
CPC ............... *A63F 13/60* (2014.09); *A63F 13/12* (2013.01); *G06Q 10/10* (2013.01); *H04L 12/1822* (2013.01); *H04L 51/02* (2013.01); *H04L 51/32* (2013.01); *H04L 65/403* (2013.01); *H04L 67/02* (2013.01); *H04L 67/10* (2013.01); *H04L 12/4641* (2013.01)

(58) Field of Classification Search
CPC .................................................. H04L 12/4641
USPC ........................................................ 709/204
See application file for complete search history.

(56) References Cited

U.S. PATENT DOCUMENTS 7,554,576 B2   6/2009   Erol et al.
8,972,503 B2   3/2015   Pearce
(Continued)

FOREIGN PATENT DOCUMENTS

WO   WO 2006/098606   9/2006
WO   WO 2008/094946   8/2008

OTHER PUBLICATIONS

"Developer's Guide Protocol," Blogger Data API, Google Search Engine, downloaded Mar. 24, 2008, pp. 1-8.
(Continued)

*Primary Examiner* — Arvin Eskandarnia
(74) *Attorney, Agent, or Firm* — Lewis Roca Rothgerber LLP (57) ABSTRACT

Systems and methods are provided for at least partially automating content generation of blog entries chronicling an entity's interaction with a multiuser environment. The same may combine automatic data generation with user-generated and/or user-edited or created narrative. The systems and methods may be employed for automatically generating and publishing descriptions, such as posting blog articles. In one implementation, a system automatically posts blog articles with automatic screenshots and automatically-generated descriptive copy of events that occur within a video game, such as in a massive multiplayer online role-playing game.

20 Claims, 10 Drawing Sheets

(51) Int. Cl.
*H04L 29/08* (2006.01)
*H04L 29/06* (2006.01)
*H04L 12/58* (2006.01)
*H04L 12/18* (2006.01)
*H04L 12/46* (2006.01)

(56) References Cited

U.S. PATENT DOCUMENTS

| | | |
|---|---|---|
| 2004/0249650 A1 | 12/2004 | Freedman et al. |
| 2005/0064935 A1 | 3/2005 | Blanco |
| 2006/0005136 A1 | 1/2006 | Wallick et al. |
| 2006/0041542 A1 | 2/2006 | Hull et al. |
| 2006/0041632 A1 | 2/2006 | Shah et al. |
| 2006/0135232 A1 | 6/2006 | Willis |
| 2006/0284981 A1 | 12/2006 | Erol et al. |
| 2007/0033419 A1 | 2/2007 | Kocher et al. |
| 2007/0038935 A1 | 2/2007 | Hull et al. |
| 2014/0342826 A1 | 11/2014 | Pearce |

OTHER PUBLICATIONS

Google Patent Search: Game events blogs web pages multi-user environment video game date of download: Mar. 27, 2014.
"Reference Guide", Blogger Data API, Google Search Engine, downloaded Mar. 24, 2008, pp. 1-3.
"What is the Blogger data API", Blogger Data API, Google Search Engine, downloaded Mar. 24, 2008, pp. 1-2.
PCT Application No. PCT/US2008/052362 International Search Report and Written Opinion dated Aug. 1, 2008.
U.S. Appl. No. 12/305,623, Office Action mailed Sep. 10, 2013.
U.S. Appl. No. 12/305,623, Final Office Action mailed Aug. 17, 2012.
U.S. Appl. No. 12/305,623, Office Action mailed Dec. 21, 2011.
U.S. Appl. No. 12/305,623, Final Office Action mailed Mar. 30, 2011.
U.S. Appl. No. 12/305,623, Office Action mailed Aug. 17, 2010.

SYSTEM AND METHOD OF AUTOMATIC ENTRY CREATION FOR BLOGS, WEB PAGES OR FILE-SHARING SITES BASED ON GAME EVENTS

CROSS-REFERENCE TO RELATED APPLICATIONS

The present application is a continuation and claims the priority benefit of U.S. patent application Ser. No. 14/447,271 filed Jul. 30, 2014, now U.S. Pat. No. 8,972,503, which is a continuation and claims the priority benefit of U.S. patent application Ser. No. 12/305,623 filed Dec. 18, 2008, now U.S. Pat. No. 8,856,225, which is a 371 National Phase application of PCT/US2008/052362 filed Jan. 29, 2008, which claims the priority benefit of U.S. provisional application 60/898,359 filed Jan. 29, 2007 and U.S. provisional application 61/062,309 filed Jan. 25, 2008. The disclosures of the aforementioned applications are incorporated herein by reference.

BACKGROUND OF THE INVENTION

1. Field of the Invention

Players of video games, including multiplayer games and other multiuser systems, have historically desired to publicize their accomplishments and exploits, at least to friends and other interested parties. For example, arcade games have traditionally incorporated a "TOP SCORE" list whereby high-scoring users could enter their initials into the list if their score was one of the top scores achieved.

Later systems that provided user information include those that provide statistics about characters in multiplayer games. One such system is incorporated into the website www.EQ2players.com, which provides statistics about player characters in the massive multiplayer online role-playing game ("MMORPG") Everquest II®. These systems provide, automatically, a certain amount of player character data, such as level and equipment information.

2. Summary of the Presently Claimed Invention

Systems and methods are provided here for at least partially automating content generation of web page entries chronicling an entity's interaction with a multiuser environment. The same may be performed in a balanced way, combining automatic data generation with user-generated and/or user-edited or created narrative.

For example, systems and methods are provided for automatically generating and publishing descriptions, such as posting blog articles. In one implementation, a system automatically posts blog articles with automatic screenshots and automatically-generated descriptive copy of events that occur within a video game, such as in an MMORPG.

Features provided in implementations can include, but are not limited to, one or more of the following items: tracking online events and activity to recognize when to generate descriptions; automatic generation of a description of an online event, including text and optional images, sounds, and/or video; accepting user editing of a generated description; allowing user text input; and automatic publishing of a generated description in one or more venues.

In one implementation, descriptions of events are generated automatically, at least in part. The system and method may create a blog for players or users of online games, with entries added automatically based on their in-game accomplishments and events, as well as those of their friends. Any notable events that were triggered during a play session may have screenshots of the scene taken automatically, and may be further informed by metadata about the area, events, NPCs, PCs, and so on. The events may thus be used to create an entry in the user's blog at, e.g., the end of the user's play session. At that point, the user can either leave the entry as the system made it, or edit it to their own tastes. Thus a blog-format journal of their adventures in-game is created, populated with one or more of data, text, screenshots and video from in-game about the event.

The player's blog page may also include the latest entries from the player's friends' blogs. In addition, the user can add completely original articles or other material to the blog (i.e., items not created by the auto-blog system).

In another implementation, the system generates and publishes the descriptions completely automatically. In this case, the descriptions and any accompanying media are not editable by the user. The automated descriptions may be used for a blog or other publishing mechanism to inform players of events in the game world. For example, an in-game newspaper could be generated in this way. Alternatively, the automatically-created entries are editable by system administrators or the game provider, but not by the end users, e.g., players.

In a further implementation, the system generates a consolidated page for a single user. The consolidated page includes content generated for multiple characters and/or games that the user is playing. Such a page would collect the blog articles from all of a user's characters in one place.

In another implementation, the system may support users utilizing XML to embed these character blogs in other web pages they might have, just as in their real life blog, i.e., a non-game blog.

In one aspect, the invention is direct towards a system for automatically generating at least partial entries in a blog or web page corresponding to events pertaining to an entity in a multiuser environment, including: a first module for implementing and operating a multiuser environment, the first module including at least a user interface, a database, and a software engine for conducting user interactions; a second module for monitoring events pertaining to an entity in the multiuser environment; a third module for selecting at least one of the events monitored by the second module based on a predetermined criteria; and a fourth module for generating an entry for a web page corresponding to the selected event.

Implementations of the invention may include one or more of the following. The entity in a multiuser environment may be a player character in a multiplayer game. The fourth module may generate an entry for a blog. The predetermined criteria may include one or more of the following: whether the player character has reached a predetermined geographic boundary within the multiplayer game; whether the player character has interacted with a predetermined non-player character or item; whether the player character has achieved a predetermined level within the multiplayer game; and whether the player character has accumulated at least a predetermined number of points within a predetermined time within the multiplayer game. The fourth module may generate an entry including a media item selected from the group consisting of: a screenshot corresponding to the event; an audio file corresponding to the event; a video corresponding to the event; and a predetermined text corresponding to the event. The fourth module may further provide an edit screen such that a user may edit the entry. The system may further include a fifth module, where the fifth module transmits the entry to a blog, a web page, a social networking site, and/or a file-sharing site.

In another aspect, the invention is direct towards a method for automatically generating at least partial entries in a web page corresponding to events pertaining to an entity in a multiuser environment, including: monitoring events pertaining to an entity in a multiuser environment; selecting at least one of the monitored events based on a predetermined criteria; and generating an entry in a web page corresponding to the selected event. The multiuser environment may be a multiplayer game.

Implementations of the invention may include one or more of the following. The entry may include a screenshot, and the generating may further include grouping or composing at least a subset of pertinent non-player characters and player characters associated with the event into a single image.

In a further aspect, the invention is direct towards a computer-readable medium, containing instructions for causing a computer to implement the method above.

In yet another aspect, the invention is direct towards a method of building an online description of activity in an environment, including: receiving data indicating an event has occurred in an environment; matching the event to a trigger, where the trigger indicates a trigger event and a response; generating descriptive data according to the response of the trigger, where the descriptive data includes at least one of text, image data, and video data; and when a network is available, publishing the descriptive data to an online resource.

Implementations of the invention may include one or more of the following. The method may further include providing an edit screen after the generating such that users may edit the generated descriptive data. The method may further include transmitting a notification of the publishing to one or more users.

Advantages of the invention may include one or more of the following. Users need not manually enter information about their characters into blogs or other web pages. Highly interesting information may be delivered about characters due to a combination of automatic text or images and editable text or images. Users can control what information about their characters is automatically posted. Other advantages will be apparent to those of ordinary skill in the art, given the teachings and disclosures here.

DETAILED DESCRIPTION

The following definitions are employed in this description.

A "multiuser environment" means any type of networked system in which one or more users interact with the environment and (if two or more users are involved) with each other. For example, in the case of a MMORPG, the multiuser environment is a multiplayer game. The term "user" refers to the individual, In some cases, the user is associated with an "entity" within the environment; in the case of a multiplayer game, users are usually associated with such an entity, where the entity is a "player character" ("PC") or avatar. A user may be associated with multiple player characters, as well as multiple multiplayer games. "Non-player characters" ("NPC") often exist within multiplayer games, and these are characters that are generated and operated by the environment itself, rather than being user-controlled. It is also noted that the environment within a multiplayer game is usually an important feature of the game, and interactions with the environment constitute a significant portion of gameplay. The environment is generally predetermined, with geographic features such as cities, building, mountains, bodies of water, rivers, caves, and the like. A "game engine", "software engine", or just "engine" renders the predetermined environment that is displayed by a user interface on the user's system. As the game engine has data stored about the geographic location of the PC within the environment, the game engine re-renders the view on the user interface as the PC moves. The term "subject PC" or "subject user" is employed to discuss a specific PC or user in relation to one or more other PCs or users, such as a group, guild, party, and so on.

A "blog" is a collection of content, and in some implementations may be placed on a web page or web site. The collection of content may have entries that correspond to the same general subject. In some implementations described here, the blog may be editable by a user. In others, the blog is not editable. A blog may be associated with the multiuser environment, and in a specific implementation may be associated with a multiplayer game. However, blogs may also be completely separate and unassociated with the multiplayer game. In the system and method described here, entries from events may be transmitted to a social networking site or other file-sharing site, such as a video file-sharing site, rather than being posted on a blog.

An "event" broadly means any occurrence in which one or more of the variables that define an entity's status change. For example, in a multiplayer game, an event means any occurrence that changes one or more of a player character's status, location, demographics, accumulated goods and money, skills, talents, professions, and so on. Different types of games may employ different types of events.

A "notable" or "trigger" event, or an "event that meets a predetermined criteria" or the like, generally refers to an event that is noteworthy, and thus may have an entry created for it by the system and method. In a multiplayer game, such events may be, e.g., achieving a predetermined level (or even an increase of any level at all), being the first PC to discover a particular geographic location or discover and/or interact with a particular NPC, accumulating a particular amount of money or points (e.g., experience points) in a given time, completing a quest, dungeon, or raid, and so on. Such events may be measured as being first with respect to the entire game community, first with respect to a given server, first of all PCs associated with a single user, and so on. An event that "pertains" to an entity, e.g., to a PC, is one that involves the PC in some way. For example, if a quest is completed by a group, the quest event would pertain to all members of the group, i.e., all PCs in the group. All members of the group may then have the quest completion be the subject of an event entry. If the group itself is an entity, e.g., if a guild has a blog, then the quest completion may also be noted on the guild's blog.

"Event data" may be screenshots, audio, video, and/or text and description, as well as combinations of these, about an event and which describe the event. Such event data may have a degree of user generation associated therewith. For example, the user may generate their own descriptive text or may edit automatically-generated text. In some implementations, the user may also choose views or angles at which screenshots or videos are shown. In some implementations, the user may "re-compose" the image, meaning to include PCs or NPCs or environmental features that were either not present or not aesthetically composed in the original screenshot. Recomposition may also include eliminating non-pertinent NPCs or environmental details to instead focus on those of greatest interest to the user. Event data may also include more objective information about what PCs and NPCs were involved in the event, which groups, guilds, and raid parties were involved in the event, the geographic location and environmental setting of the event, and any other data and/or metadata concerning the event.

"Automatic text creation" or "automatically-generated text (or description)" refers to text that is pre-set or is built from predefined components, and is either used in an entry per se or is made editable by a user. For example, if a quest is completed, there is often text that would be appropriate to display no matter how the PC completed the quest. The same is true if the PC discovers a particular geographic location, item, or PC or NPC, achieves a certain level, and so on.

To "automatically" perform an action is to cause the action to occur, without user intervention, upon the condition of a trigger. For example, an entry may be automatically created for a blog upon the occurrence of an event that meets a predetermined criteria.

An "entry" is a "media item" that describes an event that meets a predetermined criteria, where the media item may include one or more of text, images, video, and so on. An entry is created by a software module, described below, and may be posted to a blog, social networking site, or file-sharing site, either automatically or upon suitable indication by a user. An entry may also be made manipulable by a user, such as by translating the same into XML format. In this way, the user may copy the same into a blog manually. Such functionality may be particularly pertinent if a user desires to copy automatically or semi-automatically-created entries into a blog that has no automatic posting capabilities. An exemplary blog of this nature may be a lifejournal-type blog or a blog unrelated to the multiuser environment. To "generate" an entry means to employ at least a subset of the event data to form code that, when posted or otherwise published, conveys information about the event to other users.

A "social networking site" is an online community of users usually connected via the Internet. The users can typically interact with each other via messaging and email, and can express preferences to each other about various interests and groups. An exemplary social networking site is Crackle™. Many of these are particularly suited for sharing video or image data, including Crackle™. These are also termed herein as video or image "file-sharing sites".

A "first module" is a set of software applications that generally provide support for the systems and methods described here. For example, the first module may include a database to store information about PCs, NPCs, and the environment. The first module also may provide a user interface. Further, the first module may include a software or game engine to operate the game and conduct and mediate interactions between the PCs and each other, NPCs, and the environment. For this module and others, it will be clear to one of ordinary skill that the applications may also be implemented in hardware, firmware, or any other media that allows storage and execution of computer instructions. Moreover, any of the modules may be combined together according to the dictates of the developer.

A "second module" is one or more software applications that monitor events pertaining to entities in the multiuser environment, e.g., that monitor events in a multiplayer game. A "third module" is one or more software applications that review the events monitored by the second module and selects those that meet a predetermined criteria. In many implementations, the second and third modules may be combined into a single module. A "fourth module" is one or more software applications that generate an entry for a web page or blog for each event that is selected by the third module or combined second and third modules. The fourth module may also create code, e.g., XML code, that may be copied by the user any other suitable application. A "fifth module" is one or more software applications that transmit the entry to the web page, blog, or file-sharing site. In some implementations, the fourth module may be combined with the fifth module.

A "group" is an arbitrary grouping or list of assembly of PCs, such as a guild, friends' group, party, raid party, and so on. A group may have its own blog or other such web page associated therewith. When an event is made the subject of an entry, messages may be sent to all members of the group to notify them of the entry.

Figure 1:
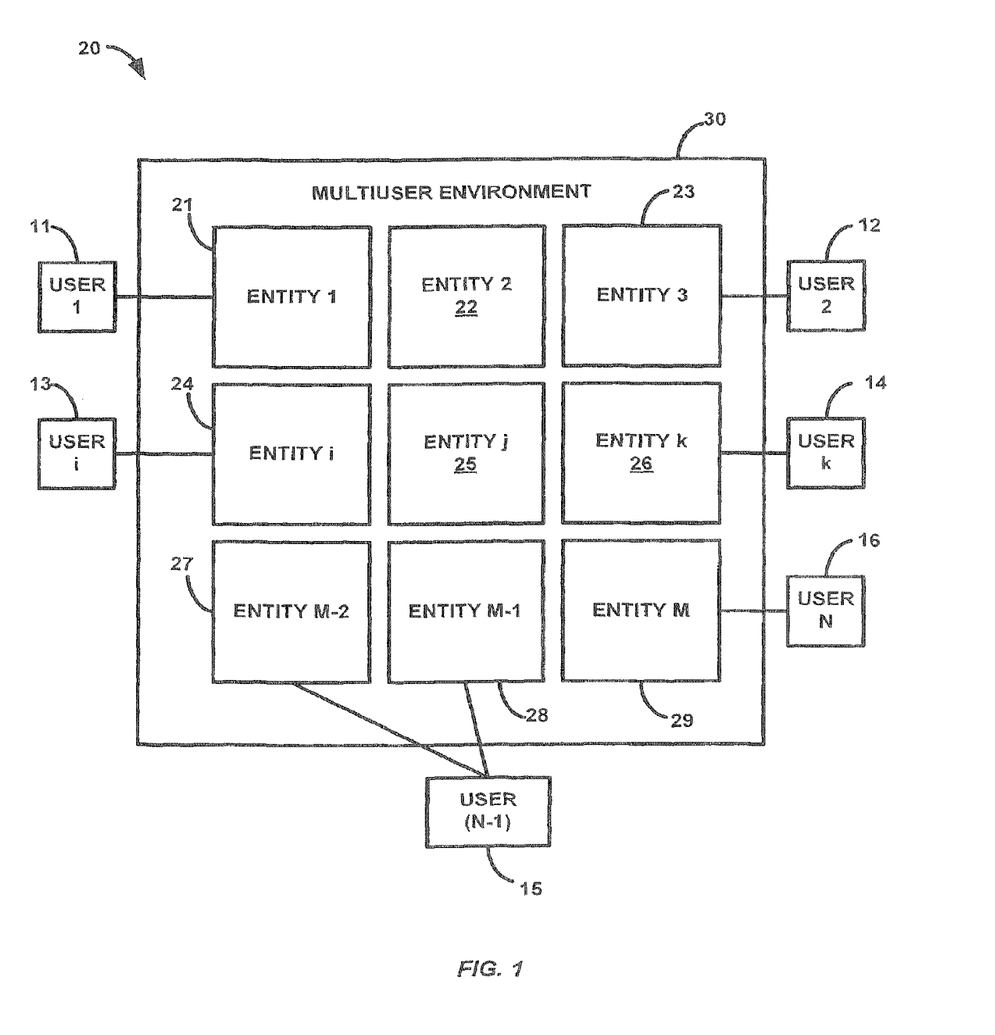
FIG. 1 illustrates a schematic depiction of a multiuser environment.

Referring to FIG. 1, a multiuser arrangement 20 is shown having a multiuser environment 30. A plurality of users [denoted users 1, 2, i, k, (N-1), and N] are shown with corresponding reference blocks 11-16, respectively. More or less users may be present in any given implementation. In the case of a small office implementation, the number N may be, e.g., less than 10. In the case of an MMORPG, the number N may be, e.g., several million. In the implementation of FIG. 1, each user controls one or more entities. In other implementations, the user may act directly on applications and data and thus an entity proxy may be unnecessary. In the implementation of FIG. 1, entities 1, 2, 3, i, j, k, M-2, M-1, and M are shown with corresponding reference blocks 21-29, respectively. As above, more or less entities may be present in any given implementation. In the case of an MMORPG, the number M may be, e.g., several million. A user may control more than one entity. For example, user 15 controls entity 27 and entity 28. Conversely, some entities may not be controlled by users. For example, entities 22 and 25 are not controlled by users.

Figure 2:
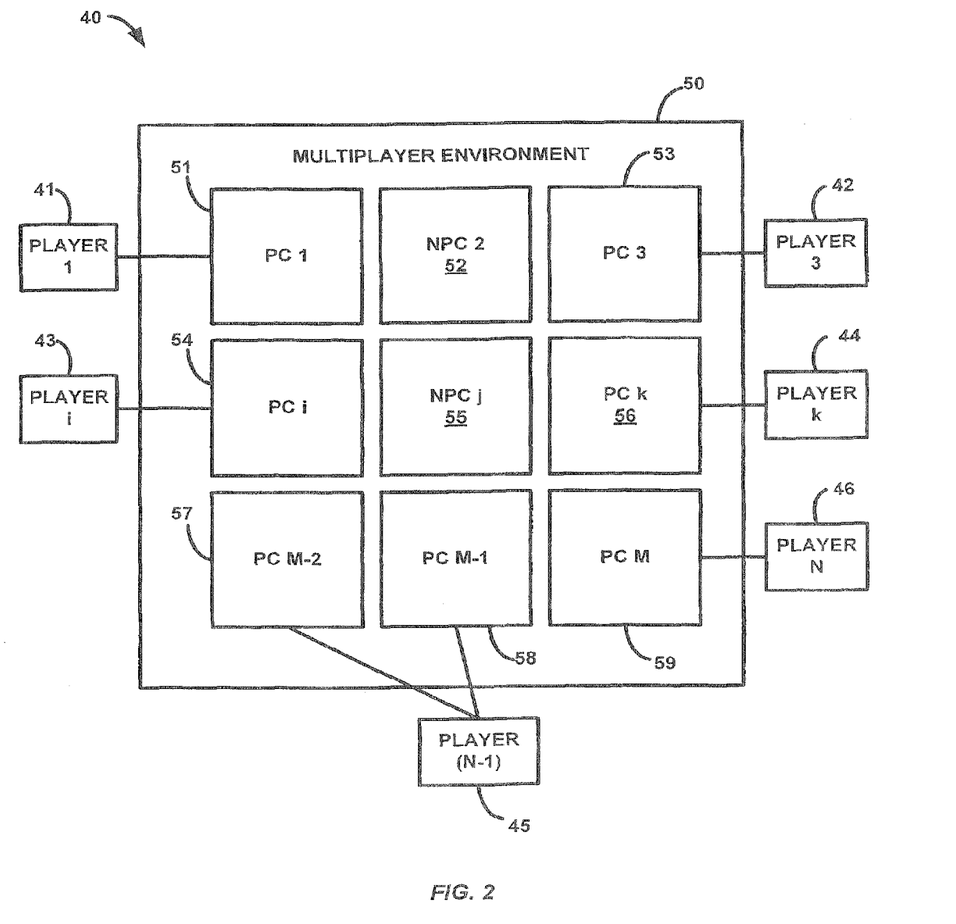
FIG. 2 illustrates a schematic depiction of a multiplayer game.

Referring to FIG. 2, the multiuser environment is shown as made specific to a multiplayer game. In particular, a multiplayer game arrangement 40 includes a multiplayer environment 50 and a set of players or users 41-46 (denoted player 1, player 2, player i, player k, player N-1, and player N, respectively). The N players control the PCs, which form a subset of the M entities. The M entities are denoted in an exemplary fashion as PC 1, NPC 2, PC 3, PC i, NPC j, PC k, PC M-2, PC M-1, and PC M, and by reference blocks 51-59, respectively. A player may control more than one PC. For example, player 45 controls PCs M-2 and M-1. NPCs 52 and 55 are controlled by the game engine described below. In the example of FIG. 2, the remainder of the players each control one PC. Of course, more or less players, and more or less PCs and NPCs, may be employed in any given multiplayer game.

Thus, there are N players and M entities formed by a combination of PCs and NPCs. M is generally greater than N.

Figure 3:
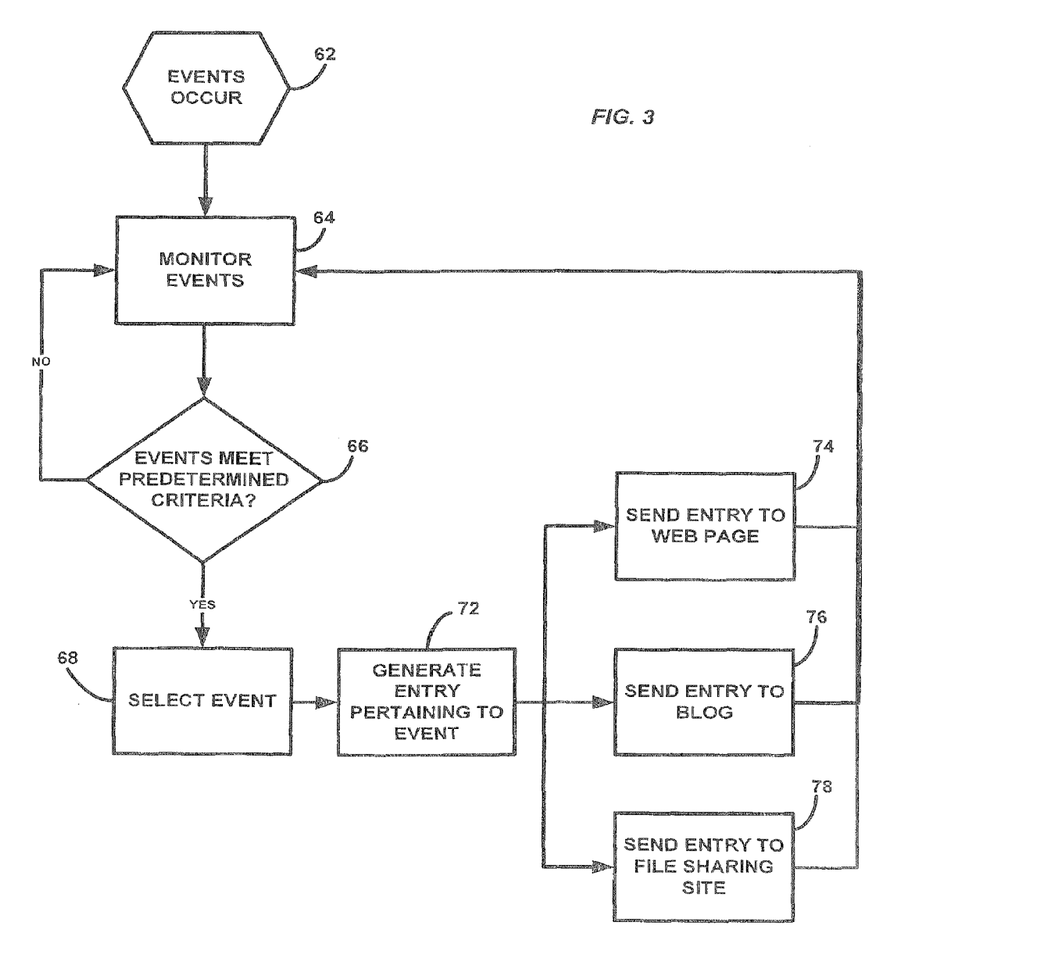
FIG. 3 is a flowchart depicting a method for automatically posting an entry corresponding to an event.

FIG. 3 illustrates a flowchart depicting a method 60 of automatically generating at least a partial entry for a blog or other web page. It is first noted that in any multiuser environment or multiplayer game, events practically continuously occur (step 62). Such events may be any noted above, or the like, with most generally not rising to the level of suitability for a blog entry or web page notation. However, the events are monitored (step 64). A determination is made as to whether a monitored event meets a predetermined criteria (step 66). For example, the monitored event may be noteworthy in some way, and may thus rise to the level of being a trigger event. Such an event is then made to be the subject of an entry in a blog or other web page.

If a given event fails to meet the predetermined criteria, then the method simply continues to monitor events. If a given event meets the predetermined criteria, then the event is selected (step 68). An entry is generated pertaining to the event (step 72). The entry may then be sent to a web page (step 74), to a blog (step 76), or to a file-sharing site (step 78). In alternate implementations, the entry may be sent to any other location or device. For example, the entry may be formatted as an instant message, SMS, or email, and sent to a mobile phone, PDA, or a separate computer system. In other words, the entry need not be sent to a blog.

In any case, the method may then repeat as shown. Of course, during entry generation, the system and method may continue to monitor events that may occur in the meantime. It is additionally noted that entries generated may be manipulated and employed by the user in any desired fashion, instead of being transmitted to a web site, blog, file-sharing site, and so on.

Figure 4:
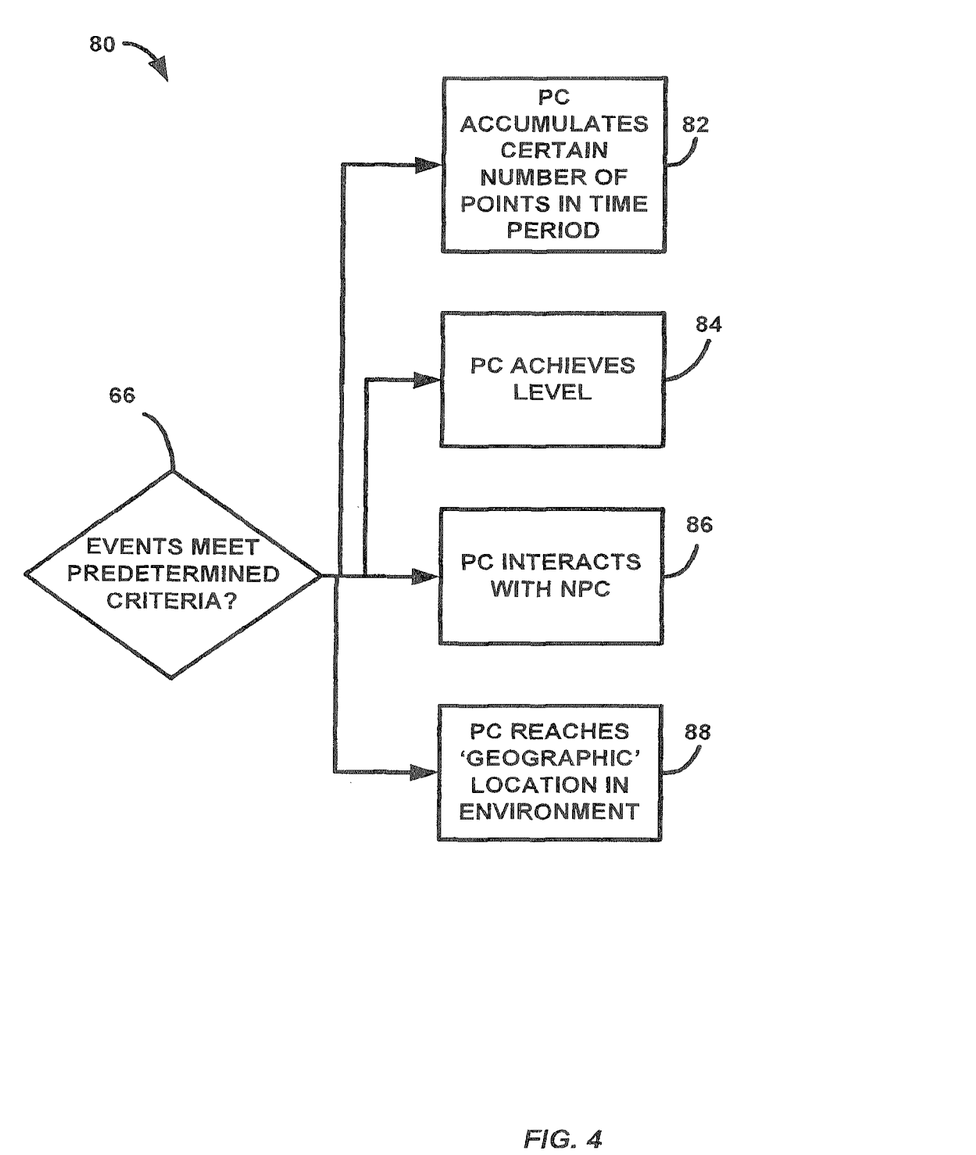
FIG. 4 is a flowchart depicting details of a step within FIG. 3.

FIG. 4 is a flowchart 80 illustrating additional details of step 66. In particular, the step of judging whether an event meets a predetermined criteria may include judging whether a variety of actions have occurred. One type of event that may give rise to an entry is that a PC accumulated a certain number of points in a time period, e.g., a certain number of experience points, money, coin, etc. (step 82). The threshold level may be set by the user, by the system, or via any other means. Another type of event that may give rise to an entry being generated is that a PC achieves a given level. In this connection, it is noted that PCs generally rise in level as experience points are gained, quests are completed, and so on. An entry may be created upon each level completion or upon notable level achievements such as level 20, 40, 60, and so on. In another implementation, an entry may be created when a PC changes their status in any other way, e.g., a change or increase in skill or talents.

A further type of event that may result or cause entry generation is when a PC interacts with a predetermined NPC (step 86). In particular, a given NPC may be deemed special or noteworthy, and PC interaction with the same may mark a certain achievement. Such an interaction may be deemed to have occurred when a PC targets the NPC, is located within a predetermined radius of the NPC (and which may vary based on level, level differences, or any other parameter), or via any other measure. Rather than an NPC, the entry generation may be triggered by a PC's interaction with another PC. In any case, this achievement may then be chronicled with a blog entry as discussed elsewhere.

Another type of event that may result or cause entry generation is when a PC reaches or is otherwise geographically coincident with a given boundary or geographic location within the virtual game environment (step 88). For example, if a PC reaches a particular city, gate, landmark, dungeon, or other geographic location, that event may be selected for event generation.

Those of ordinary skill in the art will recognize that, given this disclosure and teaching, numerous other types of events, as dictated by the developer, may also give rise to a generation of an entry. For example, finding a predetermined item or environment detail may be cause for entry generation. Defeating a given NPC or PC when the subject PC's health is at a very low level (e.g., 5% or less) may give rise to generation of an entry. Defeating a particular PC (as determined and set by the user, e.g., a friend) may cause an entry to be generated. In some cases, humorous events may be subjects of entries. For example, a defeat by a particularly notorious NPC may be made into an entry, and in this or other circumstances, automatic notification of a user's friends may be especially appropriate. Another trigger for entry generation may be by the system monitoring chat channels, such as guild or raid channels, and creating an entry upon determination that a keyword has been used, e.g. the name of a specific NPC. In an audio chat channel, the system may employ voice recognition to determine if such a keyword has been spoken.

In some implementations, users may provide input as to what triggers are employed, and where generated entries are sent. For example, users may indicate that entries should be created whenever their PC achieves ten levels, e.g., upon PC achievement of levels 10, 20, 30, etc. Alternatively, a user may desire entry generation whenever their PC achieves a new level. Users may also customize the entry transmission. For example, a user may configuration the system such that upon completion of a specific quest, a chosen group of users are notified; the same user may configure the system so that, upon achieving a new level, no users are notified but a small entry in the PC's blog page is generated to memorialize the event.

Figure 5:
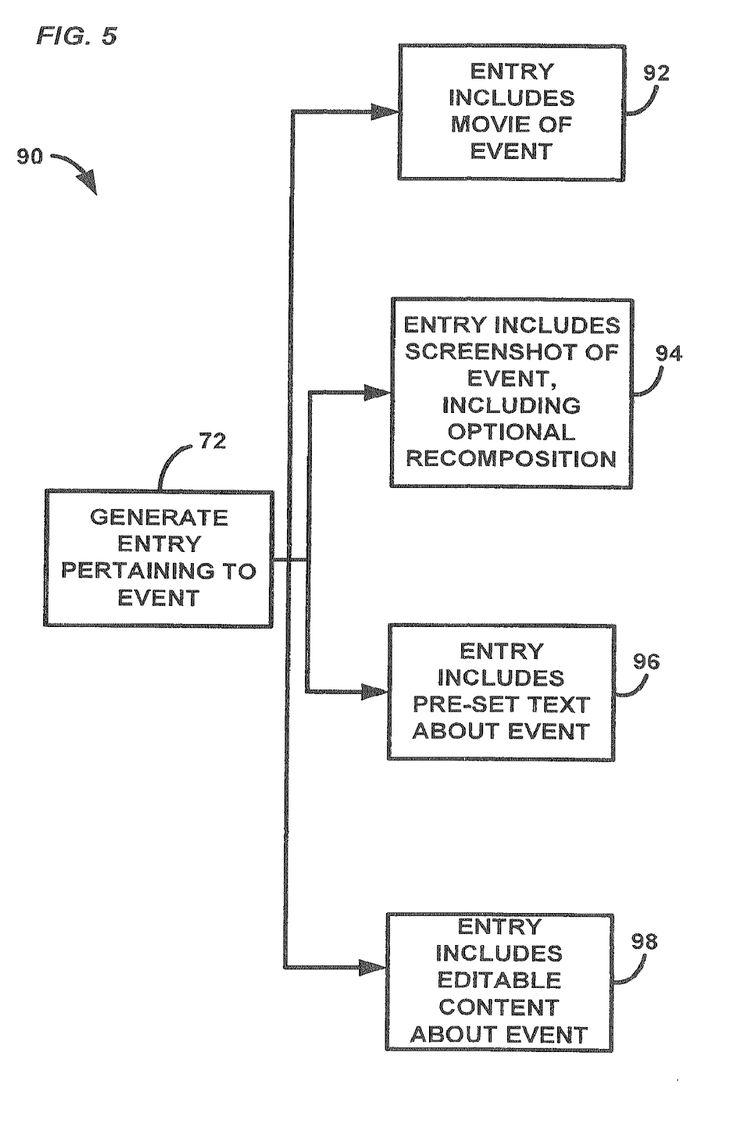
FIG. 5 is a flowchart depicting details of another step within FIG. 3.

FIG. 5 is a flowchart 90 illustrating additional details of step 72. In particular, the step of generating an entry pertaining to an event may include a number of actions. One type of entry generation is to generate an entry that includes a video or movie of an event (step 92). For example, an entry may contain a video clip for downloading, streaming, or otherwise viewing. Alternatively, the entry may contain a link to a site where the video may be viewed or downloaded. In any case, the video may contain a predetermined number of seconds or minutes of video, including times before and after the actual occurrence of the event. The amount of video may be set by the user or may be automatically provided by the system, and may be made dependent on the system resources available to the user.

Another type of entry generation is to generate an entry that includes a screenshot of the event (step 94). The screenshot may be as simple as the actual screenshot of the event as it occurred, or a step of recomposition may occur. The recomposition may include, as noted above, inclusion of PCs or NPCs who were not in the actual screenshot as seen by the player, exclusion of undesired PCs or NPCs, exclusion or inclusion of environment scenery, re-posed characters so that the same appear in a more aesthetic fashion, and so on. It is noted that recomposition may also be performed for videos and movies of the event.

Yet a further type of entry generation is to generate an entry that includes a pre-set text about the event (step 96). The text may be made editable by the user via a suitable edit screen (step 98). In this way, the user may edit the pre-set text, add to it, or entirely replace it. A pop-up screen may be employed to allow user selection of several pre-set text options. The pre-set text may vary per character. In this way, the pre-set text may accommodate differences in PC races, classes, professions, genders, etc.

Those of ordinary skill in the art will recognize that, given this disclosure and teaching, numerous other types of entry generation may also be employed.

Figure 6:
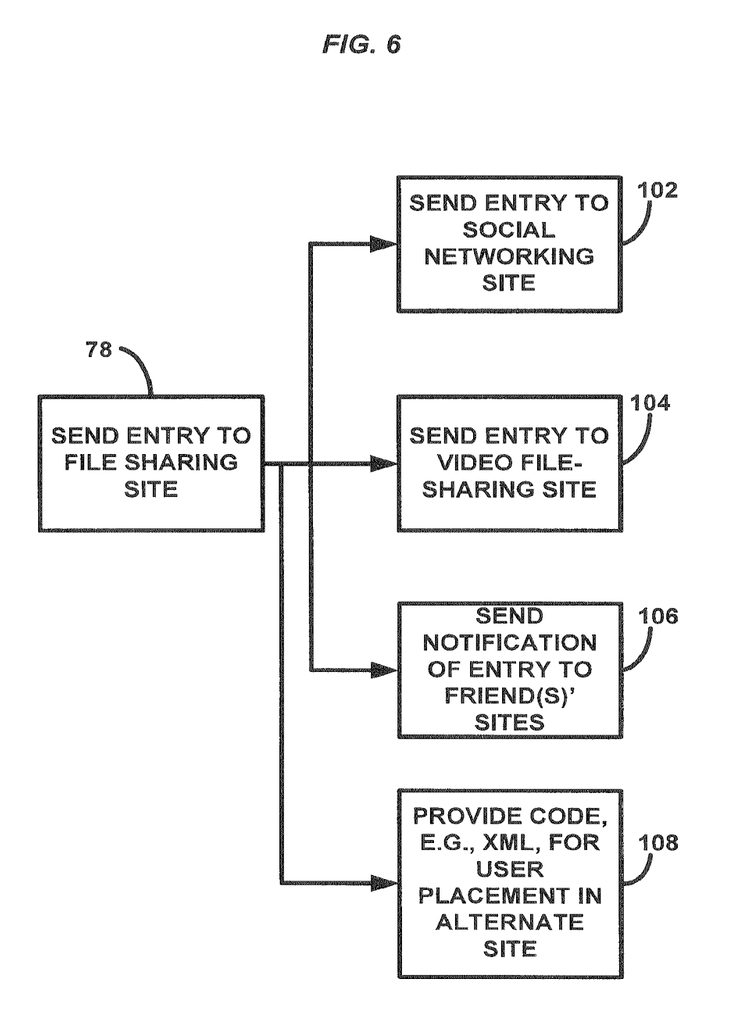
FIG. 6 is a flowchart depicting details of a further step within FIG. 3.

FIG. 6 is a flowchart 100 illustrating additional details of step 78. In particular, the step of sending an entry to a file-sharing site may include a number of actions. One type of sending includes sending the entry to a social networking site (step 102), e.g., Crackle™. This step may occur automatically, the user may be prompted for such a sending, or the user may manually copy generated code into an appropriate form on the file-sharing site. Another type of sending may include sending an entry to a video (or other such audio, image or text) file-sharing site (step 104). This is in some ways similar to step 102, as social networking sites often allow uploaded multimedia files.

FIG. 6 also shows that a notification of the entry may be sent to users associated with the subject player (step 106). In particular, rather than the entry itself, a notification of the same may be sent to a group of users, if the subject player has constructed such a group on the applicable system. For example, a multiplayer game may have a corresponding blog system for maintaining blogs and blog entries about the PCs in the game. Users may provide information to the blog system about who they would like to be notified of events. The user may provide several lists, e.g., a friends list, a guild list, a raid party list, and other such groupings. When an entry is posted, each user on the one or more lists (as dictated by the settings controlled by the subject player) may receive an email, an SMS, in-game mail, or other such notification of the entry posting.

In the same way, each group may have created for them a blog or other site. For example, a guild may have their own blog. When a triggering event happens to the guild, the event may be made an entry on the guild blog. The same may be true of a raid party, a group of friends, a group of people with similar interests, and so on.

The transmission or sending of an entry in an automatic fashion to a blog or other file-sharing site may occur on any number of schedules. For example, the sending may occur as soon as the event is selected and an entry is generated. Alternatively, the entry may be sent at the end of a play session. In other implementations, the entry may be sent once a day on a regular basis, once a week, etc.

The system and method may also generate and provide code for a user to manually copy into an appropriate form or other such editor on a file-sharing site (step 108). The code may be provided in, e.g., XML format, for such purposes. Of course, any other such code may also be provided. The user could use the provided code to insert an entry into a web page, file-sharing site, blog, or for any other purpose. Any image or video or other multimedia files may be embedded or linked-to or provided in any other suitable manner.

Figure 7:
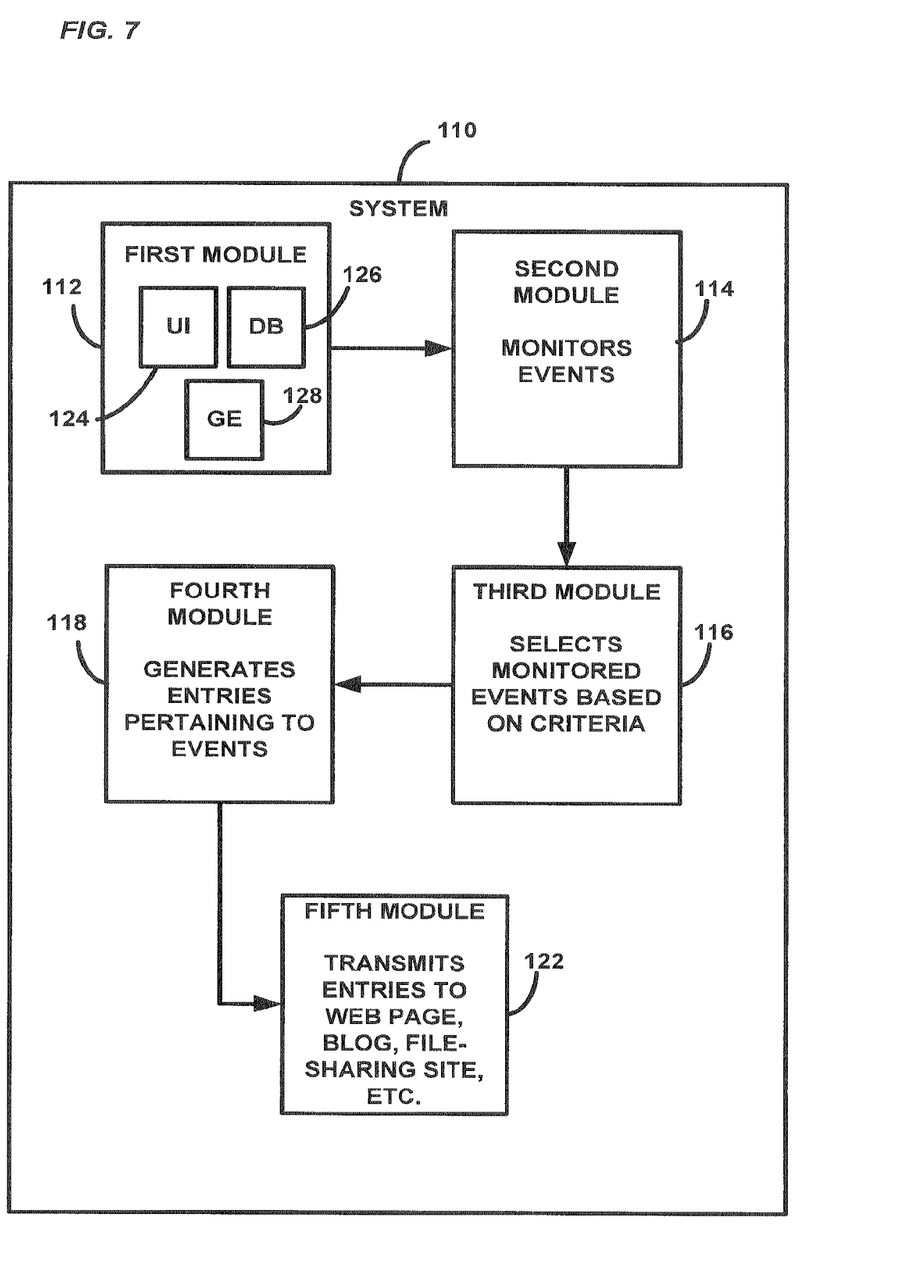
FIG. 7 is a schematic diagram of a system for automatically posting an entry corresponding to an event.

FIG. 7 shows an arrangement 110 which may implement the system for automatically generating at least a partial entry for a blog or other web page. The arrangement includes a first module 112, a second module 114, a third module 116, a fourth module 118, and a fifth module 122. The modules may be combined in any number of combinations as will be clear to one of ordinary skill in the art given this teaching and disclosure. The first module 112 may include a user interface module 124, a database module 126, and a software or game engine module 128. Generally, the first module operates much of the multiuser environment or multiplayer game.

The second module 114 may serve to monitor the events that occur, e.g., as part of the operation of game engine 128. The second module 114 may perform this task in a number of ways. For example, the second module may review occurring events against a list of predetermined criteria. When a event is found that matches or exceeds a predetermined criteria (depending on the nature of the event), then that event may be selected. The event may be selected by the third module 116, or by the second module 114. As noted above, the second module 114 and the third module 116 are shown as separate modules in FIG. 7, but the same may be combined into a single module. Further as noted, all of the modules may be combined into one or more software applications.

A fourth module 118 reviews the selected events and creates an entry corresponding to the same. For example, the fourth module 118 may retrieve (if necessary) and store a video of the event, e.g., 10 seconds before and 10 seconds after, as well as place the same into a blog entry format. The fourth module 118 may retrieve and place into a blog entry a screenshot of the event, and may provide the user with options for re-composing the image portrayed by the screenshot. For example, the fourth module 118 may provide a drop-down list of the PC's group members, or alternatively of the PCs and NPCs within a set radius of the event, and may give the user the option to include or delete any of the named character's images from the screenshot. In many cases, if the event corresponds to a defeat of a particular NPC or PC, the user may wish to have the PCs standing atop or adjacent the NPC or PC to signify their victory. Pop-up or drop-down lists may also be provided for inclusion or exclusion of environmental details.

The fourth module 118 may also retrieve and place into a blog entry preset, predetermined, or automatic text about an event. Further, the fourth module 118 may provide an edit screen to a user so that automatic text or a screenshot may be edited.

In any case, the fourth module 118 formats the video, audio, screenshot image, text, and any other multimedia file corresponding to the event in such a way that the same may be the subject of a blog entry, file-sharing site, and so on.

The fifth module 122 transmits the entries to a web page, blog, file-sharing site, or alternatively provides ready-made code, e.g., XML code, so that the user can cut-and-paste the same into any type of file or web page desired. In one implementation, the fifth module provides a series of radio buttons (or other indicators) allowing the user to choose whether they wish to post the entry to a file-sharing site such as Crackle™, create an XML code for later posting, or post the entry on a PC's blog site. In another implementation, a settings panel or menu may allow the user to indicate that any or all future entries be posted to the desired site, rather than having the user choose for each individual entry.

The data collected using the above described system may be stored on the client side, on the server side, or via a combination of client-side and server-side storage.

One of ordinary skill in the art will see numerous variations given this teaching and disclosure. For example, some events may be considered group or guild events, and others solo or individual events. The first may be posted to a group or guild blog and the latter to an individual PC's blog. Some events that are particularly visually interesting may be posted to a video file-sharing sites. Others, that are of great interest but are not necessarily visually interesting, such as a character reaching level 60 or 70, may be listed on a PC's blog but with no video of the event necessarily uploaded. Decisions as to where and what to post may be fully or partially automated given user-set or alternatively default criteria, or may be manual, e.g., made on a per-entry basis.

One of ordinary skill in the art will recognize that the various modules may be combined as noted, and may be implemented in any combination of hardware, software, and so on. Further, in many multiplayer games, due to the number of players and bandwidth requirements, each arrangement 110 may be duplicated any number of times on any number of servers.

Figure 8:
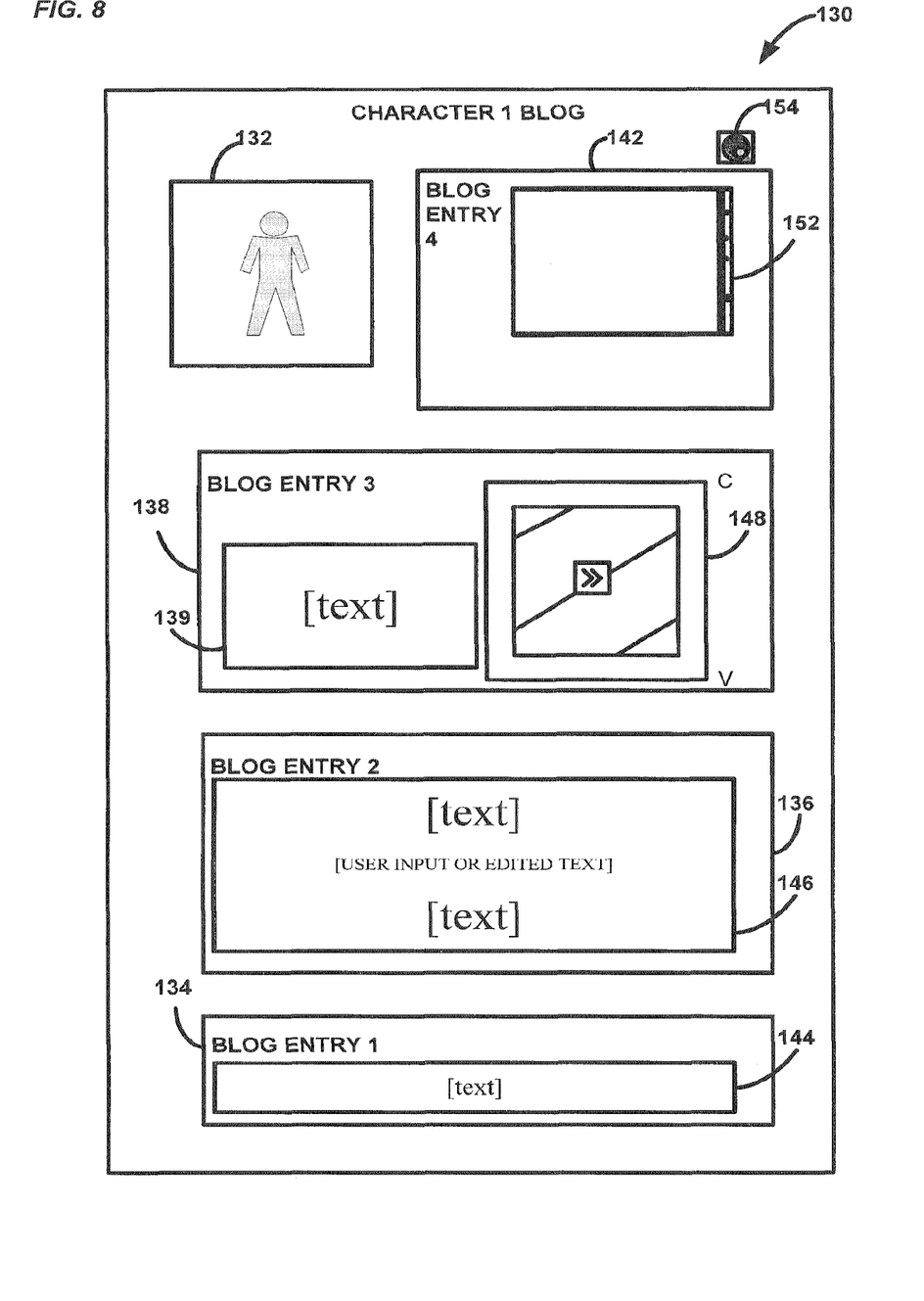
FIG. 8 shows an exemplary blog page for a character.

FIG. 8 shows a blog-type web page 130 for a subject PC "character 1". An image 132 of character 1 may be displayed, and this image may be chosen by the user or may be a default image provided or derived from the image files within the MMORPG. A series of blog entries 1-4 are shown, i.e., entries 134042. Entry 134 is shown with pre-set text 144; entry 134 has no editable or edited text within. Entry 136 is shown with user-inputted, edited, or editable text 146. Entry 138 is shown with a video 148 and text 139, the latter of which may be pre-set and/or editable as described previously. Clicking the play button ">>" starts playback, e.g., streaming, of the video of the event. Finally, entry 142 has a screenshot 152 disposed thereon. The screenshot may be of any of the types listed above, including re-composed screenshots.

FIG. 8 also has a search button 154. Other web page tools may also be provided (not shown).

Of course, the blog 130 may have more or less entries than are shown in FIG. 8.

The blog of a group, PC, user, and so on, may be accessible by users using the internet or other network but may also be made accessible in-game. For example, users of the multiplayer game may be given a menu option, button, or other in-game tool to directly access PC, guild, or other such blogs. These in-game blogs may be the same as those described above, or may be shortened, summarized, abstracted, or otherwise abbreviated versions of the same. The same may be accessible in a separate blog view or via numerous other ways. For example, selecting a PC in a given way may display that PC's blog. Similarly, selected a guild name or banner may display that guild's blog. Other variations will be apparent given this teaching and disclosure.

Figure 9:
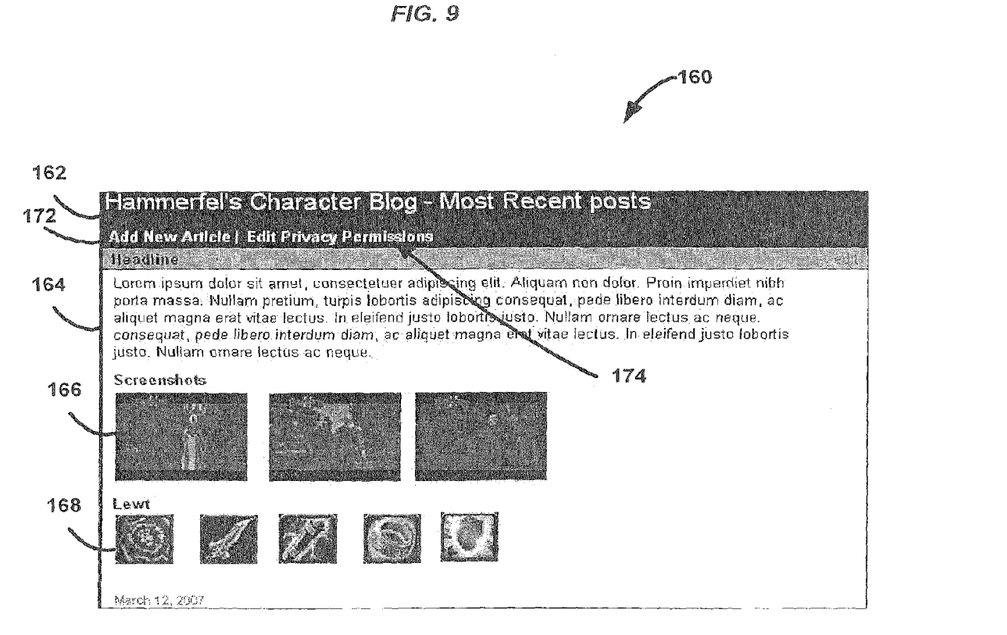
FIG. 9 shows another exemplary blog page for a character.

FIG. 9 shows another implementation of a character blog, this for a character "Hammerfel". This character blog 160 incorporates a title line 162, text 164 corresponding to a headline (which may pertain to the most recent post about the character), one or more screenshots 166 (which may pertain to the latest exploits of the PC), and icons 168 corresponding to the virtual goods received via the character's exploits. Numerous other items pertaining to the character may also be posted, as will be understood. Various web tools may also be provided, as are indicated by buttons 172 and 174.

Figure 10:
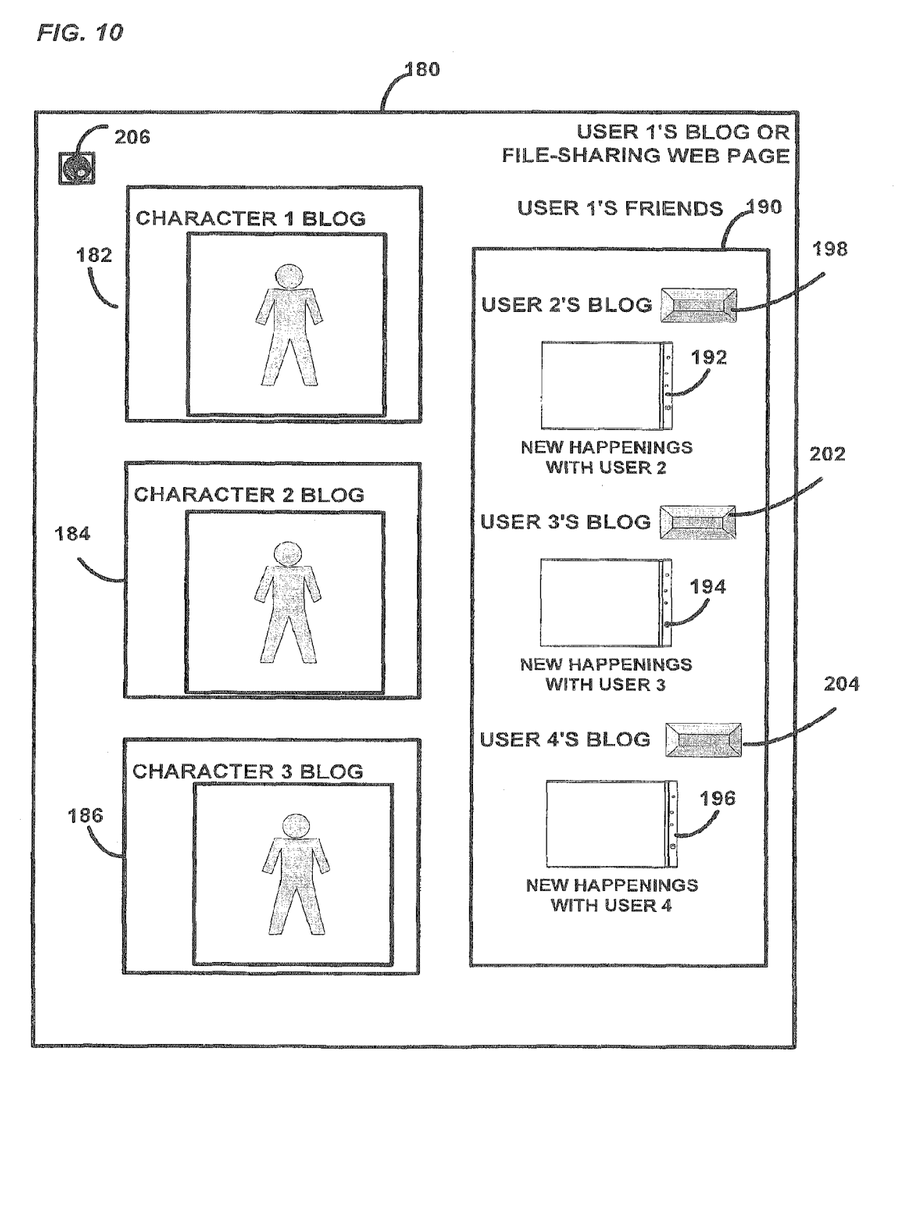
FIG. 10 shows a blog page for a user, indicating several characters and several friends or associated users.

FIG. 10 shows another implementation of a user blog or file-sharing web page 180. This implementation includes several buttons linking the page 180 to various PCs controlled by the user ("user 1"). FIG. 10 shows buttons 182-186 which perform this function. In this example, images of the characters are portrayed on the buttons. These characters may be for one or more multiplayer games played by the user. The page 180 further has a section 190 which links to friends' or users' pages associated with the user of page 180. For example, the user may choose in a setup page to have these friends' linked-to in this section, or the same may be automatically set-up as being part of the user's guild, group, and so on. FIG. 10 shows buttons 198-204 which link to pages for user 2, user 3, and user 4. FIG. 10 also shows an image corresponding to the latest postings for these users. The image may be a screenshot, text, video, etc. If a video, placing the cursor over the image may result in playback of the video. This layout is purely exemplary, and numerous variations may be employed. For example, the page may only list characters of user 1, or may list only friends of user 1. The number of characters and friends may range from none to virtually any number.

One implementation includes one or more programmable processors and corresponding computer system components to store and execute computer instructions, such as to provide the blog system and perform the blog method, e.g., to generate the text description and select images or videos to include in a blog entry.

Additional variations and implementations are also possible. For example, while the discussion above focuses on game applications, similar techniques can be applied in other contexts to build descriptions of online or offline activity, such as email systems, online meeting tools, versioning software, project planning and management software, accounting systems, and others. As another example, the systems and methods described here may be employed to monitor employee or family activity via creation of a blog that chronicles work performed, websites visited, and so on. Another implementation is in the field of online education software, where blog entries may be employed to chronicle a student's progress or for any other purpose.

In a further implementation, the systems and methods described here may be used in non-MMORPG game contexts. For example, the game system need not be continuously online, and the game need not be a multiplayer one. The user's game system may be employed to track events and generate entries, and once a connection is made to the internet (or any other such network), the entries may be transmitted and consumed in any way noted above.

Accordingly, the invention is to be limited only by the claims appended hereto.

What is claimed is:

1. A method for automatically generating blog content, the method comprising:
    storing information in memory regarding one or more in-game events, each event defined by a set of predetermined criteria;
    receiving information regarding gameplay of a user over a communication network, wherein the gameplay information concerns interactions of a virtual entity controlled by the user;
    detecting that an event has occurred based on the set of predetermined criteria being met by the gameplay information of the user;
    generating blog content corresponding to the detected event, wherein the blog content is generated from predefined components associated with the detected event; and
    transmitting the generated blog content over the communication network to a designated website, wherein the generated blog content is automatically published on the designated website.

2. The method of claim 1, further comprising trigger input from the user, wherein the trigger input selects one or more of the predetermined criteria.

3. The method of claim 1, wherein the detected event is a change in at least one of status, location, demographics, accumulated goods and money, skills, talents, or professions.

4. The method of claim 1, wherein the predetermined criteria include at least one of achieving a predetermined level, entering a predetermined location, finding a predetermined item, finding an environment detail, interacting with another character, accumulating an amount of points, completing a task, defeating a predetermined other player, an achievement by a group of which the user is a member, or detecting use of a keyword within a channel associated with the game.

5. The method of claim 1, further comprising receiving input over the communication network, wherein the input sets one of the predetermined criteria at a threshold level.

6. The method of claim 1, wherein the predefined components include predetermined media associated with the detected event, and wherein the predetermined media includes preset text, graphics, audio, or video of the detected event.

7. The method of claim 6, wherein the graphics include at least one screenshot before, during, or after the detected event.

8. The method of claim 6, wherein a duration of the audio includes a predetermined number of seconds before the detected event and a predetermined number of seconds after the detected event.

9. The method of claim 6, wherein a duration of the video includes a predetermined number of seconds before the detected event and a predetermined number of seconds after the detected event.

10. The method of claim 1, wherein the designated website is a social networking website.

11. The method of claim 1, further comprising formatting the generated blog content based on a type of device designated to receive the transmitted generated blog content.

12. The method of claim 1, further comprising allowing the blog content to be edited by the user prior to transmitting to the designated website.

13. The method of claim 12, wherein editing the blog content comprises selecting from a plurality of preset text options.

14. The method of claim 12, wherein editing the blog content comprises recomposing the blog content to do at least one of including a character or scenery that was not present in the detected event, excluding a character or scenery that was present in the detected event, or reposing a character or scenery.

15. The method of claim 1, further comprising notifying a predetermined group of friends defined by the user regarding the published blog content.

16. The method of claim 15, further comprising receiving information from the user regarding a plurality of groups, wherein each group is notified in accordance with settings specific to the group.

17. The method of claim 16, wherein the settings are selected by the user.

18. The method of claim 15, wherein the designated website is associated with the predetermined group.

19. The method of claim 1, further comprising linking the blog content to one or more predetermined friends.

20. A non-transitory computer-readable storage medium, having embodied thereon a program executable by a processor to perform a method for automatically generating blog content, the method comprising:

storing information in memory regarding one or more in-game events, each event defined by a set of predetermined criteria;

receiving information regarding gameplay of a user over a communication network, wherein the gameplay information concerns interactions of a virtual entity controlled by the user;

detecting that an event has occurred based on the set of predetermined criteria being met by the gameplay information of the user;

generating blog content corresponding to the detected event, wherein the blog content is generated from predefined components associated with the detected event; and transmitting the generated blog content over the communication network to a designated website, wherein the generated blog content is automatically published on the designated website.

* * * * *